United States Patent [19]

Fitzpatrick

[11] Patent Number: 5,404,733
[45] Date of Patent: Apr. 11, 1995

[54] CASSETTE LOCK DEVICE

[76] Inventor: Daniel J. Fitzpatrick, 3623 Avenue T, Brooklyn, N.Y. 11234

[21] Appl. No.: 88,369

[22] Filed: Jul. 9, 1993

[51] Int. Cl.$^6$ .............................................. F05B 73/00
[52] U.S. Cl. ........................................ 70/14; 70/58; 70/371
[58] Field of Search ................. 70/14, 57–58, 70/63, 158, 163, 166–169, 370, 371, 416, 417; 292/DIG. 38, 37, 124, 140, 182; 206/387, 389, 391; 242/197, 199; 360/132, 137

[56] References Cited

U.S. PATENT DOCUMENTS

| 2,905,494 | 9/1959 | Tocchetto | 292/182 |
|---|---|---|---|
| 4,028,913 | 6/1977 | Falk | 70/58 |
| 4,144,728 | 3/1979 | Boynton et al. | 70/58 |
| 4,527,405 | 7/1985 | Renick et al. | 70/14 |
| 4,628,713 | 12/1986 | Cecchi et al. | 70/371 X |
| 4,693,096 | 9/1987 | Mercer | 70/14 |
| 4,716,745 | 1/1988 | Hehn | 70/370 X |
| 4,763,784 | 8/1988 | Newell | 70/14 X |
| 4,799,370 | 1/1989 | Cooper | 70/57 X |
| 4,959,979 | 10/1990 | Filipow et al. | 70/58 |
| 5,117,661 | 6/1992 | Carl et al. | 70/14 |
| 5,261,259 | 11/1993 | Ployd | 70/167 X |

Primary Examiner—Peter M. Cuomo
Assistant Examiner—Suzanne L. Dino

[57] ABSTRACT

A cassette lock includes a transparent block arranged for viewing nomenclature of an associated cassette to be secured, wherein the transparent block includes a lock cylinder directed therethrough, the lock cylinder arranged in operative communication with an actuator rod mounting a cam at its lowermost end. The cam in simultaneous communication with diametrically opposed lock pins permits projection of the lock pins from the lock cylinder to capture a cassette member between the lock pins and a bottom wall of the transparent block.

5 Claims, 4 Drawing Sheets

CASSETTE LOCK DEVICE

BACKGROUND OF THE INVENTION

1. Field of the Invention

The field of invention relates to cassette apparatus, and more particularly pertains to a new and improved cassette lock device wherein the same is directed to the latching of a cassette permitting controlled access to utilization of the cassette.

2. Description of the Prior Art

Prior art locking structure for video cassettes typically employs a covering structure such as indicated in U.S. Pat. No. 4,930,821. U.S. Pat. No. 4,628,713 indicates a locking structure for video cassettes including a cylinder having a projecting tang arranged for projection through a bottom surface of the cassette structure.

U.S. Pat. No. 4,928,197 indicates a base plate having a locking protrusion for use with an associated cassette structure.

As such, it may be appreciated there continues to be a need for a new and improved cassette lock device for use particularly with video cassettes to permit the projection of the locking device above and below the cassette preventing its use and in this respect, the present invention substantially fulfills this need.

SUMMARY OF THE INVENTION

In view of the foregoing disadvantages inherent in the known types of video cassette locking device structures now present in the prior art, the present invention provides a cassette lock device wherein the same is directed to the projection of locking pins below the associated cassette. As such, the general purpose of the present invention, which will be described subsequently in greater detail, is to provide a new and improved cassette lock device which has all the advantages of the prior art video cassette locking structure and none of the disadvantages.

To attain this, the present invention provides a cassette lock including a transparent block arranged for viewing nomenclature of an associated cassette to be secured, wherein the transparent block includes a lock cylinder directed therethrough, the lock cylinder arranged in operative communication with an actuator rod mounting a cam at its lowermost end. The cam in simultaneous communication with diametrically opposed lock pins permits projection of the lock pins from the lock cylinder to capture a cassette member between the lock pins and a bottom wall of the transparent block.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cassette lock device which has all the advantages of the prior art video cassette locking structure and none of the disadvantages.

It is another object of the present invention to provide a new and improved cassette lock device which may be easily and efficiently manufactured and marketed.

It is a further object of the present invention to provide a new and improved cassette lock device which is of a durable and reliable construction.

An even further object of the present invention is to provide a new and improved cassette lock device which is susceptible to a low cost of manufacture with regard to both materials and labor, and which accordingly is then susceptible to low prices of sale to the consuming public, thereby making such cassette lock devices economically available to the buying public.

Still yet another object of the present invention is to provide a new and improved cassette lock device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
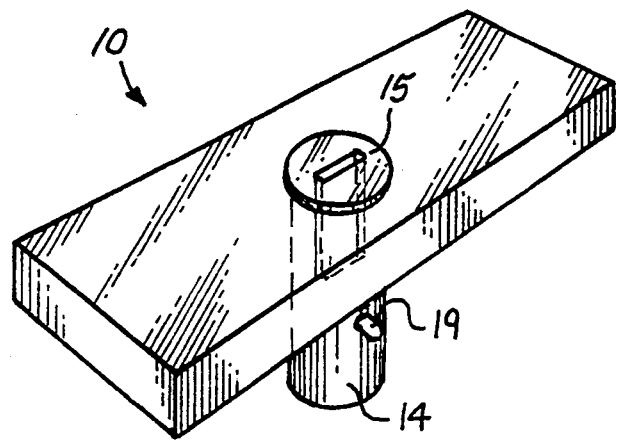
FIG. 1 is an isometric view of the invention.
Figure 2:
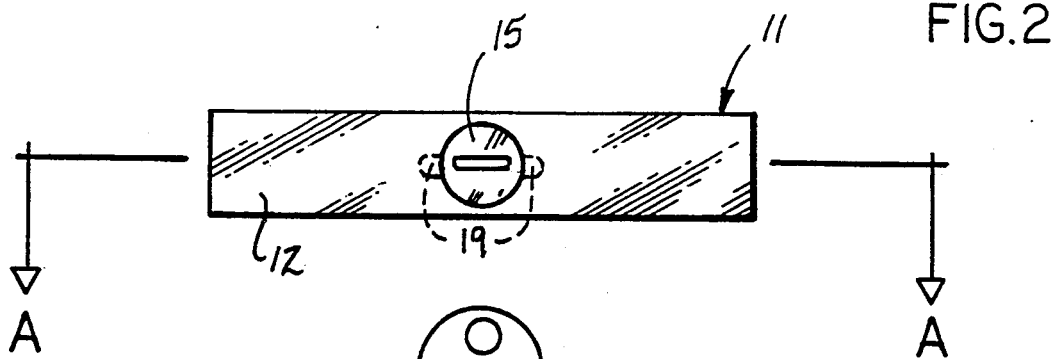
FIG. 2 is an orthographic top view of the invention.
Figure 3:
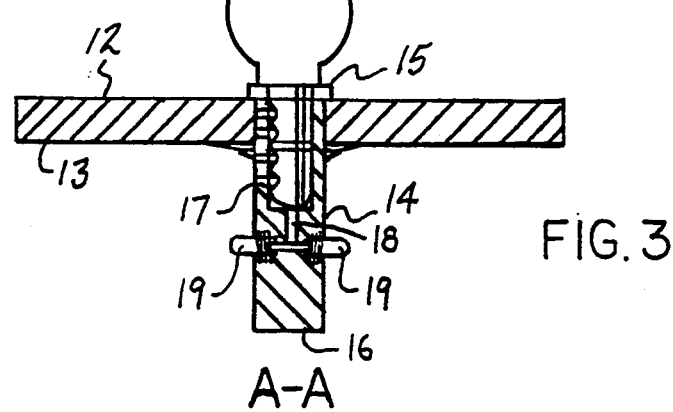
FIG. 3 is an orthographic view, taken along the lines 3—3 of FIG. 2 in the direction indicated by the arrows.
Figure 4:
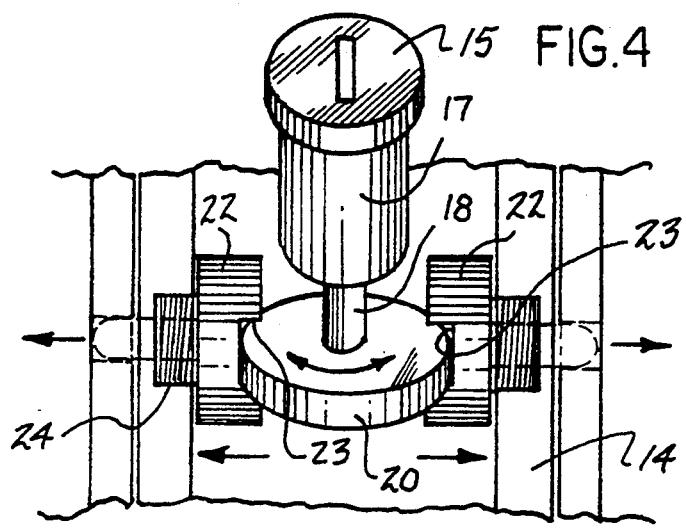
FIG. 4 is an isometric illustration of the device in a retracted configuration.
Figure 5:
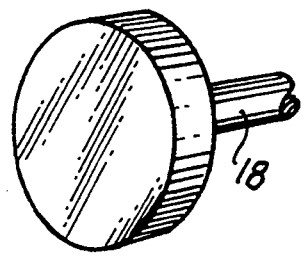
FIG. 5 is an isometric illustration of the cam structure.
Figure 6:
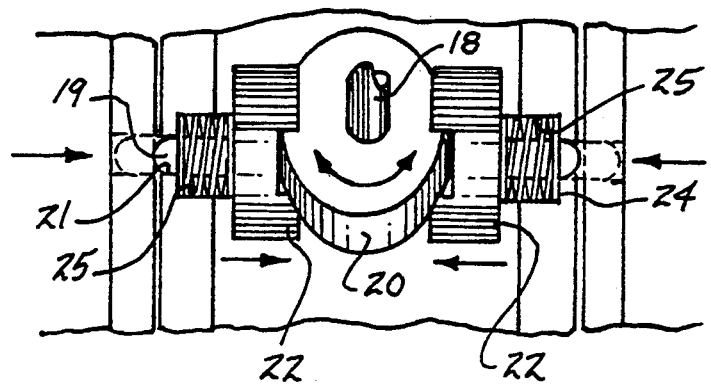
FIG. 6 is an isometric illustration of the cam and a retracted orientation of the lock pins.
Figure 7:
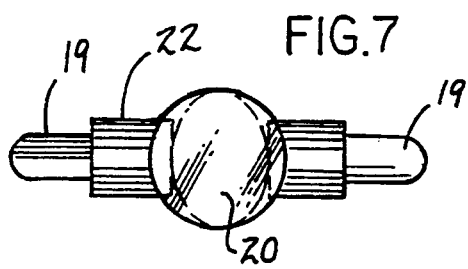
FIG. 7 is an orthographic view of the cam associated with locking pin bosses.
Figure 8:
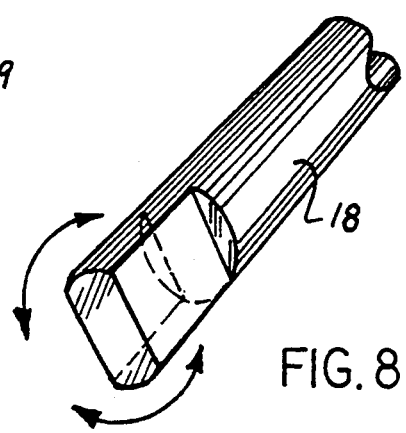
FIG. 8 is an isometric illustration of the actuator rod structure.
Figure 9:
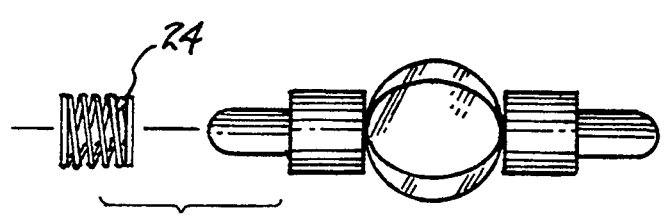
FIG. 9 is an orthographic top view of the cam arranged in protected orientation relative to the locking pins.

With reference now to the drawings, and in particular to FIGS. 1 to 13 thereof, a new and improved cassette lock device embodying the principles and concepts of the present invention and generally designated by the reference numeral 10 will be described.

Figure 10:
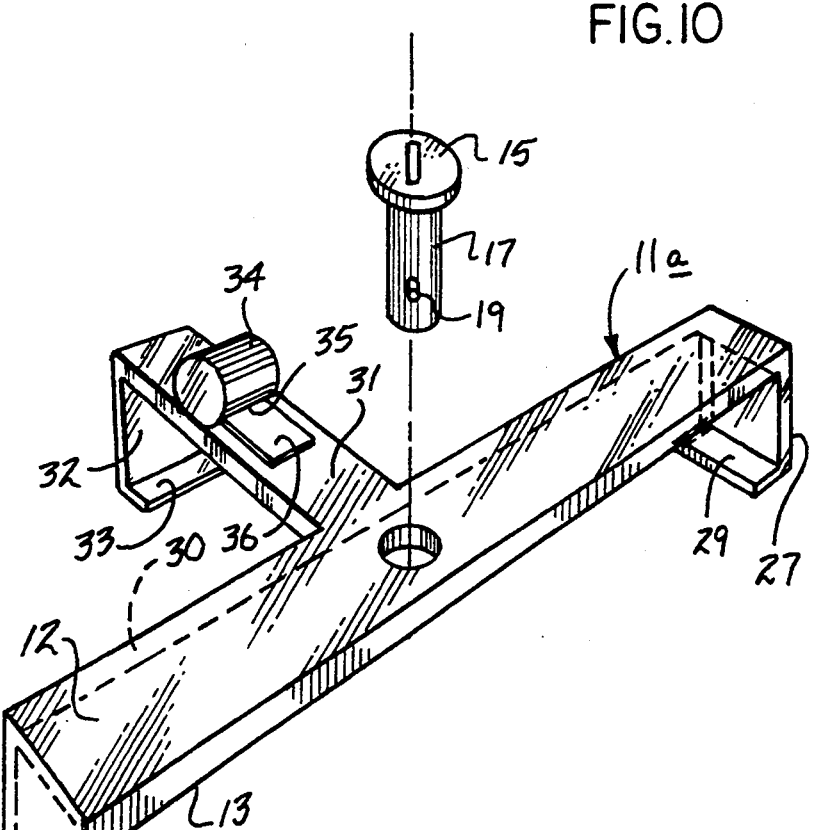
FIG. 10 is an isometric illustration of a modified aspect of the invention.
Figure 11:
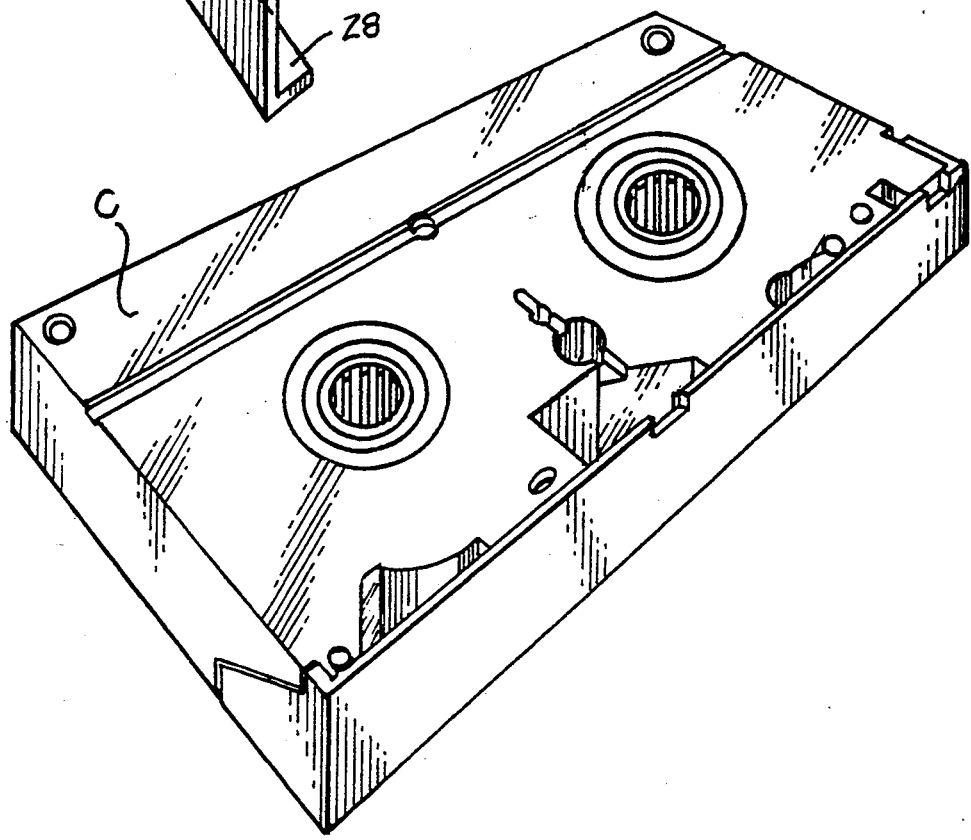
FIG. 11 is an isometric illustration of a conventional video cassette for use by the invention.
Figure 12:
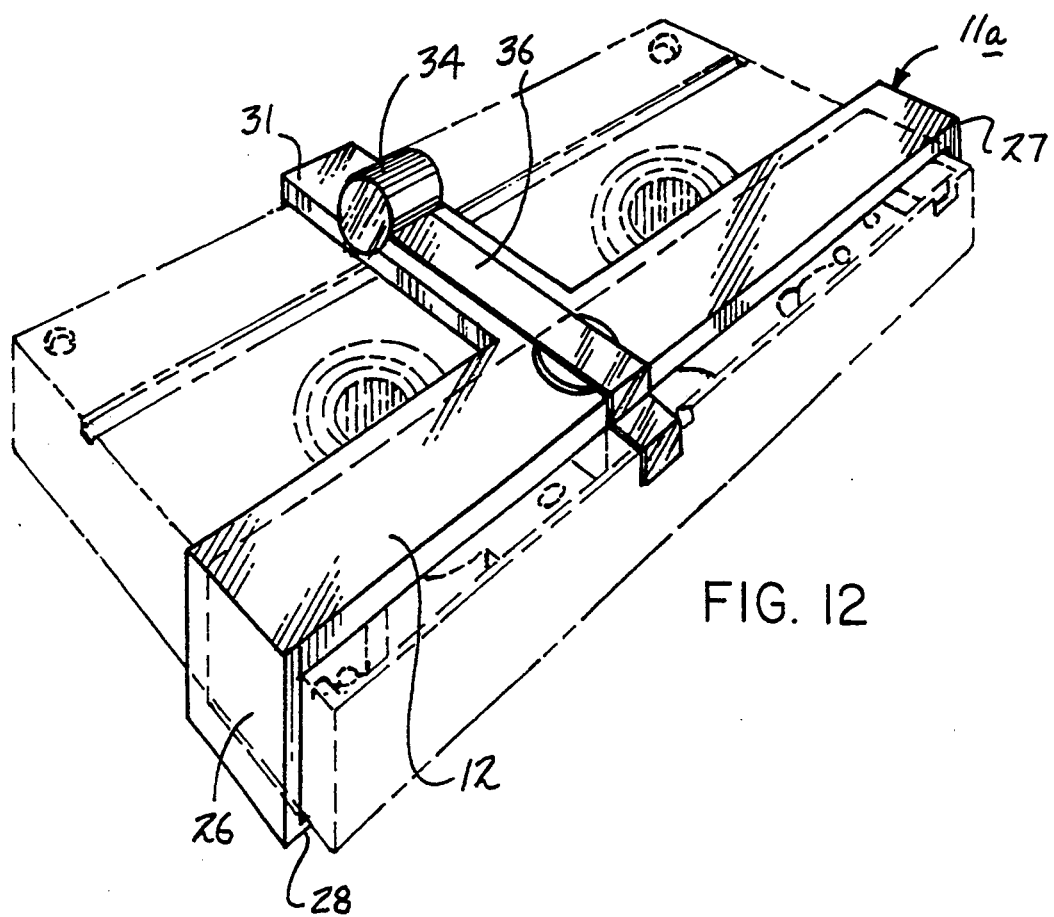
FIG. 12 is an isometric illustration of a video cassette in cooperation with the invention, as indicated in FIG. 10.
Figure 13:
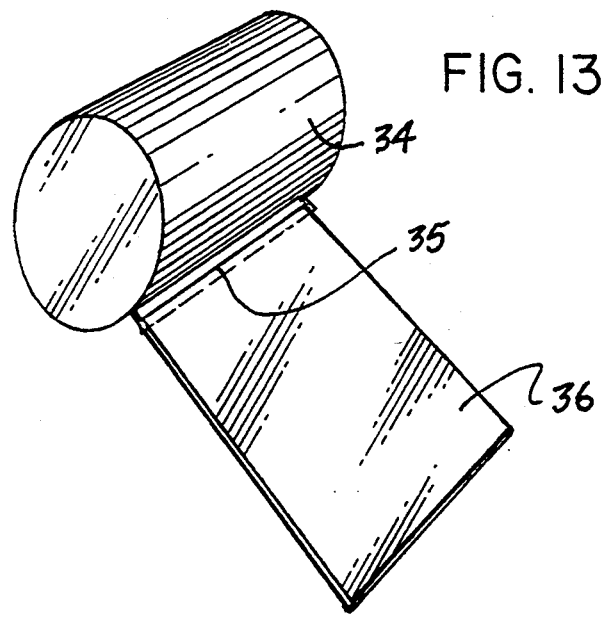
FIG. 13 is an isometric illustration of a tape housing structure, as indicated for use by the invention as indicated in FIG. 10.

More specifically, the cassette lock device 10 of the instant invention essentially comprises a transparent block 11 having a block top wall 12 spaced from a block bottom wall 13, whereupon mounting upon a cassette "C", such as indicated in the FIGS. 10 and 11, visual observation of various markings may be visible. A lock cylinder 14 is orthogonally directed through the transparent block 11 projecting from the bottom wall 13 and therebeyond terminating in a lock cylinder second end 16 spaced from a lock cylinder first end 15 substantially coplanar with the top wall 12, such that the second end 16 is spaced to accommodate a lock tumbler 17 through the lock cylinder. The lock tumbler 17 includes an actuator rod 18 fixedly mounted radially of the lock cylinder 14 to the tumbler 17, such that the actuator rod includes a cam plate 20 orthogonally mounted at the actuator rod lowermost end. Locking pins 19 are radially mounted within the lock cylinder radially aligned with the cam plate 20, such that each of the locking pins 19 is slidably received through a lock cylinder bore 21. Each lock pin 19 includes a lock pin boss 22, having a lock pin boss slot 23 receiving the cam plate 20 therethrough. A spring member 24 is interposed between each lock pin boss 22 and received within a spring member recess 25 within the lock cylinder 14, such that upon rotation of the actuator rod 18 upon rotation of the tumbler 17, the locking pins 19 project from the lock cylinder 14.

The FIG. 10 indicates the use of a modified transparent block 11a, having a transparent block first end flange 26 orthogonally mounted to the transparent block first end, such that a transparent lock second end flange 27 is orthogonally mounted to the transparent block second end projecting from the bottom wall 13. The first end flange 26 terminates in a first flange plate 28 extending below the bottom wall, the second end flange 27 terminating in a second flange plate 29 extending below the bottom wall to secure the cassette "C" between the first and second flange plates 28 and 29 and the transparent block bottom wall. The locking pins 19 are spaced from the block bottom wall 13 a spacing substantially equal to a thickness of an associated cassette to latch the associated cassette between the locking pins and the transparent block bottom wall. Further, an extension plate 31 extends from the transparent block rear side wall 13 substantially coplanar therewith, with the extension plate 31 terminating in a plate flange 32 orthogonally oriented relative to the extension plate spaced from the transparent block rear side wall 30, with a locking flange 33 mounted to a lowermost end of the plate flange 32 to secure the cassette. Further, a tape housing 34 is mounted upon the extension plate 31, having a tape housing outlet 35, whereupon a sealing tape 36 is arranged for extension from the tape housing 34 to extend over the associated cassette to further indicate visual sealing of the structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A video cassette lock device, comprising,
a transparent block, including a top wall, a bottom wall, a block rear side wall, a block forward side wall, a first end wall spaced from a second end wall, and
a lock cylinder directed orthogonally through the block top wall and the block bottom wall extending beyond the bottom wall, with the lock cylinder having a lock cylinder first end spaced from said bottom wall, said lock cylinder having a lock cylinder first end oriented in adjacency to the top wall, with the lock cylinder having a tumbler therewithin, the tumbler in operative communication with an actuator rod permitting rotation of said actuator rod, and
a plurality of locking pins diametrically aligned relative to one another projecting reciprocatably through said lock cylinder, with actuator means mounted to said actuator rod for effecting selective projection of said locking pins through said lock cylinder, whereby the lock cylinder communicates with an aperture in the video cassette to thereby capture the video cassette between the lock pins and the bottom wall of the transparent block.

2. A device as set forth in claim 1 wherein said actuator means includes a cam plate fixedly and orthogonally mounted to said actuator rod, with each of said locking pins including a lock pin boss, with each lock pin boss having a slot, with said slot receiving said cam plate therethrough, and each lock pin boss including a spring member captured between said lock pin boss and said lock cylinder to bias each lock pin within said lock cylinder.

3. A device as set forth in claim 2 wherein a first end flange is fixedly mounted to said transparent block at said block first end, with said first end flange orthogonally oriented relative to said bottom wall, with a second end flange fixedly mounted to said transparent block second end, with said first end flange and second end flange arranged in a parallel relationship relative to one another in a coextensive relationship, with a first flange plate fixedly mounted to said first end flange, spaced from said bottom wall, and a second flange plate fixedly mounted to said second end flange, with said first flange plate and said second flange plate extending below said bottom wall.

4. A device as set forth in claim 3 wherein said rear side wall includes an extension plate fixedly mounted thereto, with said extension plate arranged coplanar relative to said top wall, with said extension plate including a plate flange fixedly and orthogonally mounted to said extension plate extending below said bottom wall, with a locking flange fixedly mounted to said extension plate flange, with said locking flange extending below said extension plate.

5. A device as set forth in claim 4 including a tape housing mounted to said extension plate, with said tape housing having a tape housing outlet, and an adhesive sealing tape arranged for extension from said tape housing through said tape housing outlet for positioning over an associated cassette member.

* * * * *